No. 826,696. PATENTED JULY 24, 1906.
J. K. STEWART.
COMBINED MOTOR AND POWER TRANSMITTING MECHANISM.
APPLICATION FILED JAN. 16, 1905.
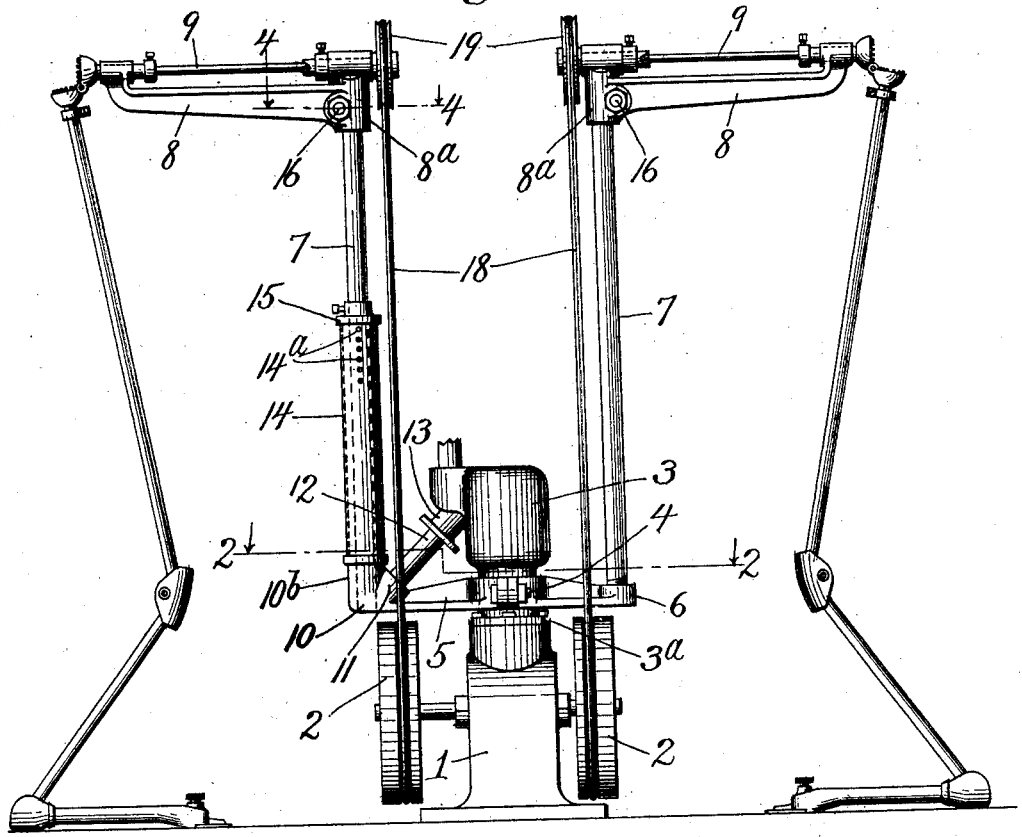
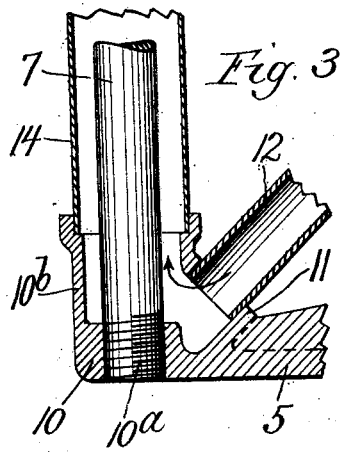
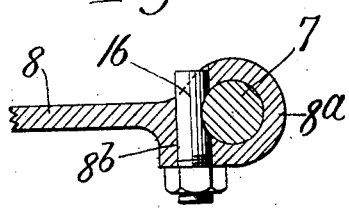
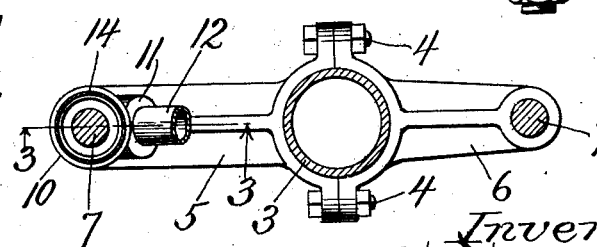
Witnesses.
Edward T. Wray.
Fred'k G. Fischer.
Inventor.
John K. Stewart
by Burton & Burton
his Atty's.

UNITED STATES PATENT OFFICE.

JOHN K. STEWART, OF CHICAGO, ILLINOIS.

COMBINED MOTOR AND POWER-TRANSMITTING MECHANISM.

No. 826,696.      Specification of Letters Patent.      Patented July 24, 1906.

Application filed January 16, 1905. Serial No. 241,401.

*To all whom it may concern:*

Be it known that I, JOHN K. STEWART, a citizen of the United States, residing at Chicago, in the county of Cook and State of Illinois, have invented new and useful Improvements in a Combined Motor and Power-Transmitting Mechanism, of which the following is a specification, reference being had to the accompanying drawings, forming a part thereof.

The purpose of this invention is to provide an improved apparatus which shall be substantially portable and shall comprise as a unitary structure a motor and a frame for a power-transmitting mechanism adapted especially for mechanism employing flexible or jointed shaft connections to operate hand-directed tools, such as animal-shears and the like.

It consists of the features of construction set out in the claim.

In the drawings, Figure 1 is a front elevation of a structure embodying this invention. Fig. 2 is a section at the line 2 2 on Fig. 1, showing the mounting of the frame for the power-transmitting mechanism on the motor-frame. Fig. 3 is a detail section at the line 3 3 on Fig. 2. Fig. 4 is a detail section at the line 4 4 on Fig. 1.

In the drawings, there is shown conventionally and without intention to present specific details which are familiar a gasolene-engine of existing construction.

1 is the frame structure of the engine, whose operating parts need not be particularly designated, but which has for the purposes of the present invention two fly-wheels 2 2 at opposite ends of its crank-shaft and opposite sides of the main frame structure, which includes the bearings of the crank-shaft. The cylinder 3 of the engine is detachably secured at the top of the base-frame structure, having the crank-shaft bearings, as indicated by the horizontal flange 3ª, by which said cylinder-casting is thus secured to the top of the base-frame, and above this flange at a neck or portion of exteriorly-reduced diameter (the reduction being due to the termination of the water-jacket at a point above the neck) there is clamped onto the engine-frame, and more specifically onto this upper portion thereof comprising the cylinder, the two-part cross-head whose two members 5 and 6 close together about the neck and are adapted to be bound thereto by bolts 4 4, taking through proper lugs provided on the two members for that purpose. This cross-head has at each end a rigid upstanding arm 7, at the upper end of which there is secured with capacity for adjustment, as hereinafter explained, a horizontally extended or overhanging gibbet-arm 8, upon which are provided at the upper side thereof bearings for a shaft 9 for transmitting power, as hereinafter explained, from the fly-wheels of the motor. One of the cross-head members 5 is formed at its outer end with a hollow elbow 10, constructed somewhat as a pipe-fitting, having a connection at 11 for a nipple 12, which leads into the elbow from the exhaust connection of the engine, (seen at 13,) so that the exhaust from the engine is discharged into the elbow, and the provision for securing the upright arm 7 to the elbow is made by a threaded engagement provided at 10ª for the lower end of such upright arm at the bottom of the upwardly-extending arm 10ᵇ of the hollow elbow, so that when the said upright arm 7 is screwed into place and made rigid thereby with the cross-head arm ample space is left around it in the elbow communicating with the nipple 12 for the exhaust-gases from the engine, and to the upper end of the elbow there is secured the sleeve 14, through which the arm 7 extends, said sleeve being perforated, as seen at 14ª, and provided with a cap-collar 15 at the upper end, which fits snugly around the arm 7 while closing the upper end of the sleeve, such perforated sleeve, with the connection described, operating as a muffler for the exhaust from the engine.

In order that the overhanging horizontal gibbet-arms 8 8 may be adjusted about the upright arms 7 to increase the range or field of operation of the tool without moving the structure as a whole and in order also to take up any slack in the driving-belt when a belt is employed for transmitting power from the fly-wheel to the horizontal shaft on the gibbet-arm, there is formed transversely to the cylindrical socket 8ª at which the gibbet-arm is pivotally mounted upon the upper end of the upright arm 7 a cylindrical bolt-seat 8ᵇ, whose complete cylindrical outline intrudes into the cylindrical socket at one side, and the bolt 16 which occupies the bolt-socket, is transversely cut away to correspond to the cylindrical socket at the point which would intrude thereinto, and this bolt being provided at one end with a nut for drawing it longitudinally serves as a means for clamping or wedging the gibbet-arm tight on the upper end of the upright arm 7 at any position to which the gibbet-arm may be swung about its pivotal connection with the upright arm.

As a convenient means of transmitting power from the motor fly-wheel to the horizontal shaft 9 on the gibbet-arm and thence to the hand-directed tool having the flexible or jointed connection with said horizontal shaft there may be employed belts 18 18 from the fly-wheels respectively to pulleys 19 19 on the inner ends of said horizontal shafts.

I claim—

In combination with an explosive-motor, a frame mounted rigidly on the frame of the motor comprising upstanding arms, power-transmitting devices mounted on such frame and power-communicating connections from the motor-shaft to such devices; a muffler for the motor consisting of a perforated sleeve encompassing one of the upstanding arms and connections from the cavity of such sleeve to the exhaust of the motor.

In testimony whereof I have hereunto set my hand, in the presence of two witnesses, at Chicago, Illinois, this 19th day of December, 1904.

JOHN K. STEWART.

In presence of—
   CHAS. S. BURTON,
   FREDK. G. FISCHER.